United States Patent
Chalich

[15] 3,669,241
[45] June 13, 1972

[54] PACKAGE ACCUMULATING CONVEYOR

[72] Inventor: Charles Chalich, Salisbury, N.C.
[73] Assignee: Taylor Manufacturing Company, Salisbury, N.C.
[22] Filed: Nov. 13, 1970
[21] Appl. No.: 89,249

[52] U.S. Cl. ..................................198/102, 198/76
[51] Int. Cl. .........................................B65g 47/44
[58] Field of Search..................198/37, 35, 110, 76, 102; 214/16 B

[56] References Cited

UNITED STATES PATENTS 3,442,401  5/1969  Wolfe et al. ..................214/16 B X
2,462,021  2/1949  Harker..........................198/37 X Primary Examiner—Evon C. Blunk
Assistant Examiner—Douglas D. Watts
Attorney—Parrott, Bell, Seltzer, Park & Gibson

[57] ABSTRACT

Packages are temporarily accumulated from a main conveyor line, in the event of a blockage of the packages from normal movement therealong, and are subsequently redelivered to the main conveyor line by a reversible conveyor apparatus for moving packages in either of two opposite directions away from and toward the main conveyor line. Control over movement of packages on the accumulating conveyor is exercised in response to sensing of the presence and absence of the excessive number of packages on the main conveyor line as pointed out more fully hereinafter.

9 Claims, 5 Drawing Figures

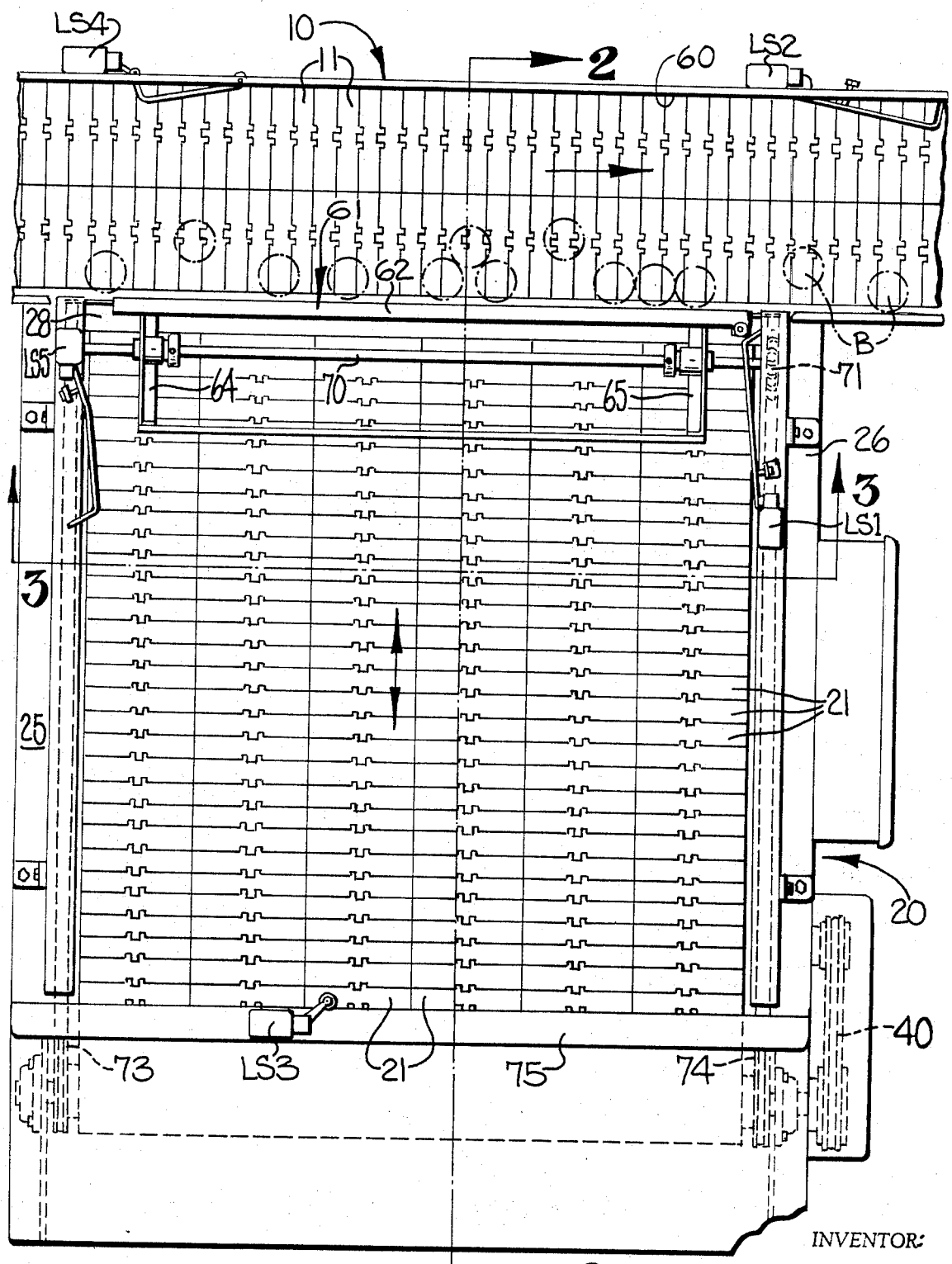

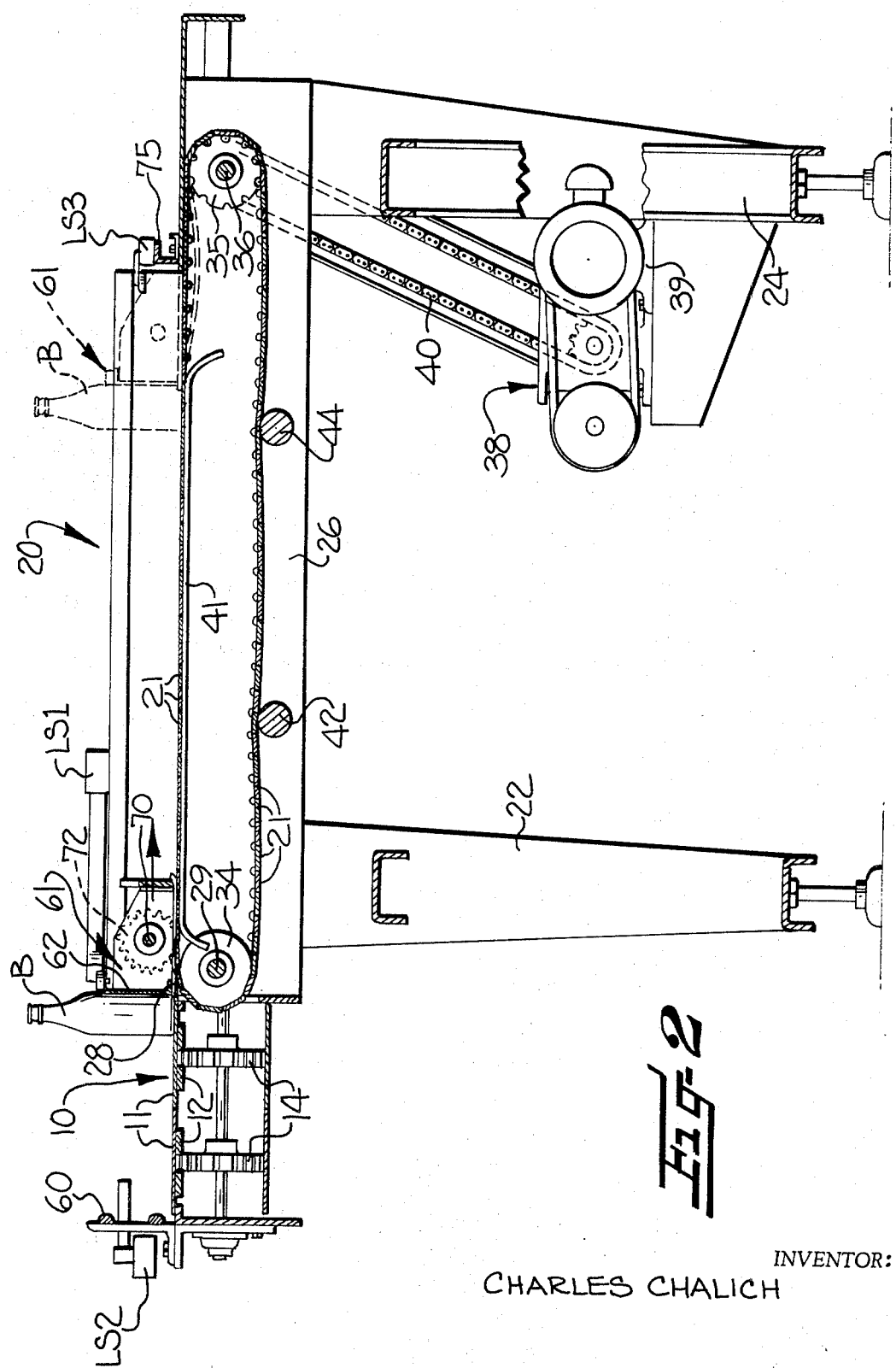

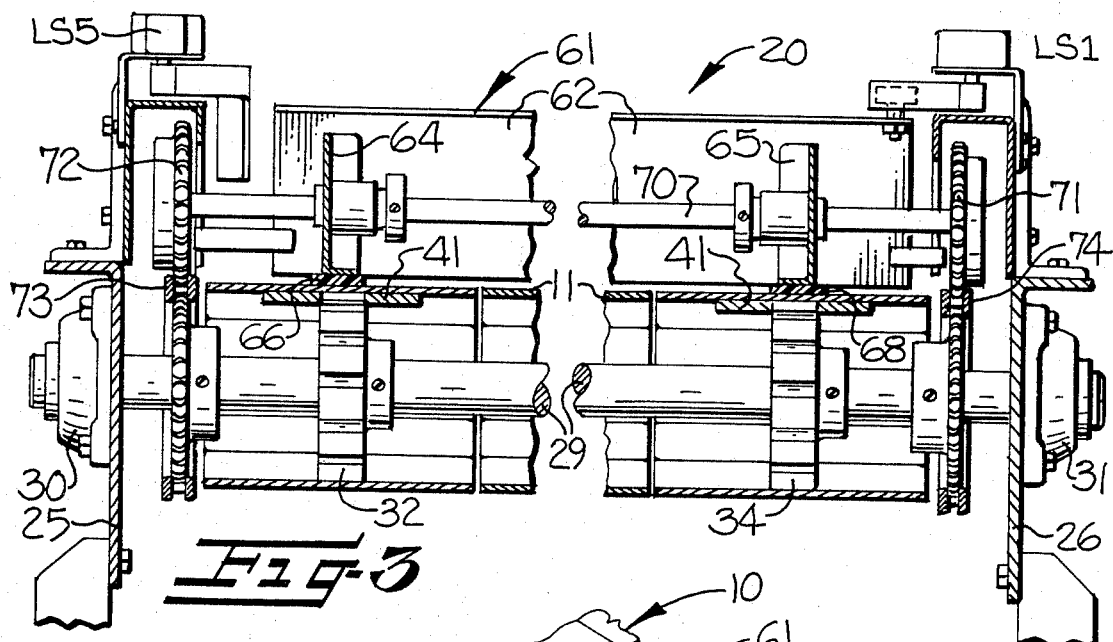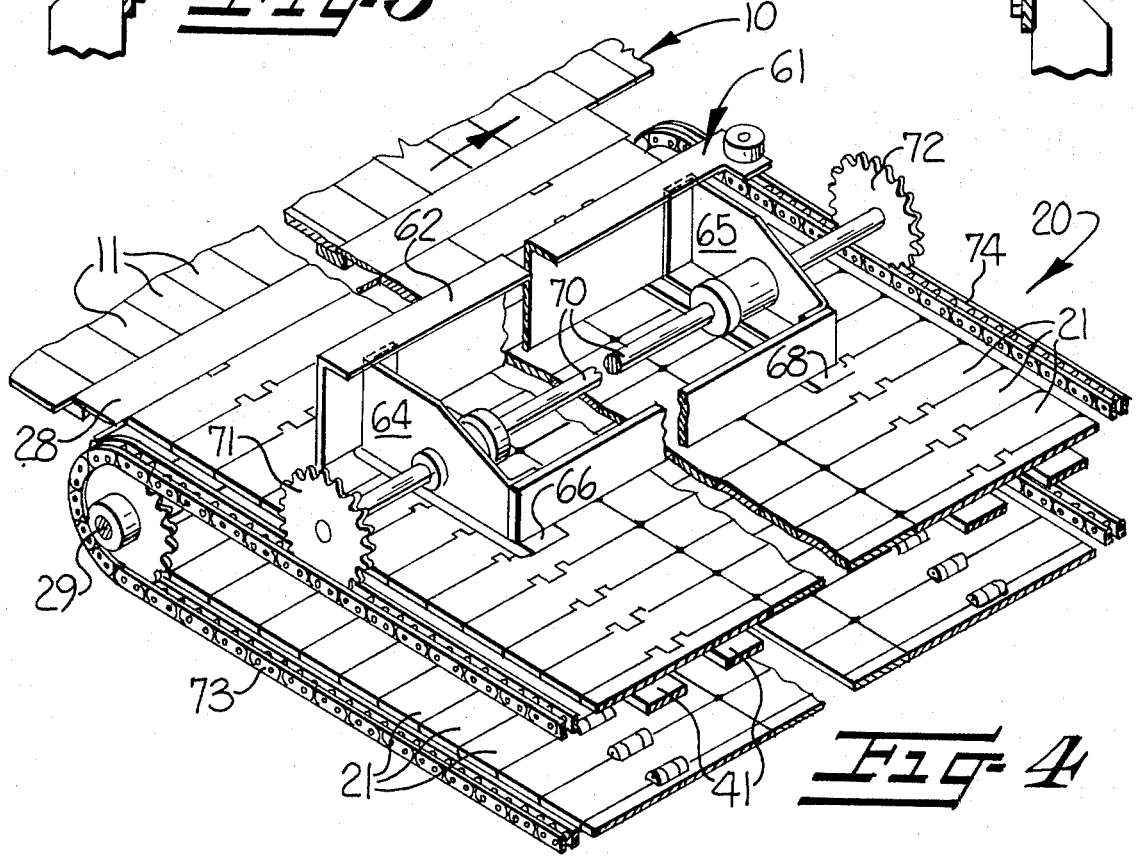

PACKAGE ACCUMULATING CONVEYOR

Due to the relatively great speeds at which automatic processing machinery may perform individual operations, it is conventional to use package transporting conveyor systems in conjunction with such automatic machinery. One example of the application of a package transporting conveyor system in conjunction with automatic machinery is the handling of cartons and bottles in conjunction with the packaging of liquid products such as soft drinks, beer and milk. In such operations, it is conventional for bottles, cans or cartons to move between various automatic machines along a main conveyor line linking the machines and normally moving packages along a predetermined path of travel.

As is well known to persons familiar with such package transporting conveyor systems, the automatic machines linked by such a system do not always operate at a common package handling rate. For example, a bottle filling machine and a carton packing machine are capable of handling packages at differing rates, but the slower bottle filling machine is typically less subject to jams and interruptions than is the carton packing machine.

As a result of such characteristics of machines used in conjunction with package transporting conveyor systems, and also in view of occasional jamming of packages moving along a main conveyor line, it is desirable to provide for continuing operation of the slower automatic machines even though packages may be blocked from normal movement along the predetermined path of travel at some point downstream of the automatic machine. The accomplishment of such continuing operation contributes to achieving the greatest possible efficiency for the overall processing operation, as may be understood.

Heretofore, such ends have been attained by temporarily accumulating packages from a main conveyor line and subsequently redelivering the accumulated packages thereto, diverting packages from the main conveyor line to a circulating secondary conveyor. Diverted packages, in accordance with such prior practices, were permitted to circulate on the secondary conveyor until such time as continued movement along the main conveyor line again became possible, with the bottles then being diverted from the secondary conveyor back onto the main conveyor line.

Such circulating secondary conveyors have commonly brought about rubbing or turning of diverted packages one against the other. In instances where the packages being handled are bottles or cans, such rubbing leads to breakage or scarring of the packages, while cartons so diverted are subject to being overturned. In any instance, a secondary conveyor for the recirculation of accumulated packages has not been a satisfactory solution.

It is an object of the present invention to accommodate fluctuations in the flow rate of packages normally moving with a main conveyor line along a predetermined path of travel by temporarily accumulating packages from the conveyor line, transporting accumulated packages away from the main conveyor line along a path perpendicular to the predetermined path of travel, and subsequently redelivering the accumulated packages to the main conveyor line by moving the packages in a reversed direction, toward the main conveyor line. By thus accumulating and redelivering packages through movement away from and toward the main conveyor line, the rubbing rotation heretofore typical of recirculating secondary conveyors is avoided and the deficiencies of such conveyors are overcome. In accomplishing this object of the present invention, a reversing conveyor means is provided, with movement of the reversing conveyor means being controlled in response to the presence and absence of excessive numbers of packages on the main conveyor line.

A further object of the present invention is to stabilize conveyed packages in a desired orientation during accumulation and redelivery thereof, to thereby facilitate maintenance of engaged packages in the normal orientation and further reduce the likelihood of overturning or damage of the packages. In accomplishing this object of the present invention, package stabilizing rail means are mounted in predetermined relation to the reversible accumulating conveyor means, for engaging packages moving onto the conveyor means.

Yet a further object of the present invention is the simplification of drive arrangements for moving packages in either of two opposite directions along a predetermined path of travel, through the provision of a reversible conveyor apparatus particularly constructed and arranged for transmittal of motive power in either of opposite rotational directions to a flexible endless loop conveyor member. In accordance with this object of the present invention, support means for the flexible endless loop conveyor member are particularly constructed and arranged to accommodate the presence of a catenary curve in the conveyor member at an upper horizontal run of the path along which the conveyor member moves.

Some of the objects and advantages of the invention having been stated, others will appear as the description proceeds, when taken in connection with the accompanying drawings, in which FIG. 1 is a plan view of a package transporting conveyor system incorporating the present invention;

FIG. 2 is an elevation view, in partial section, taken generally as indicated by the line 2—2 in FIG. 1;

FIG. 3 is an elevation view, partially in section, taken generally as indicated by the line 3—3 in FIG. 1;

FIG. 4 is a perspective view of portions of the apparatus of FIGS. 1-3, particularly illustrating a package stabilizing rail means in accordance with the present invention.

Figure 5:
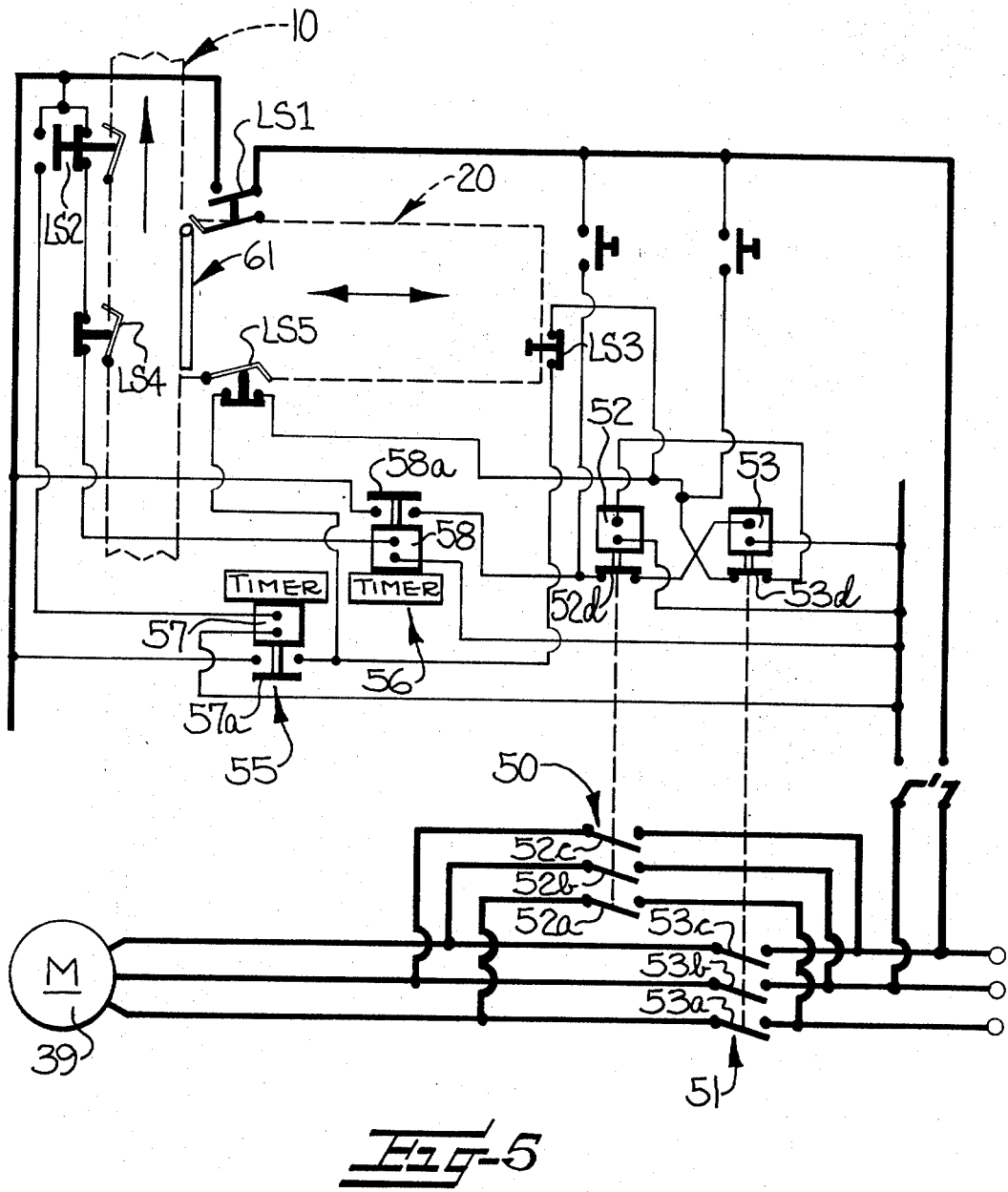
FIG. 5 is a schematic wiring diagram of an electrical control means for the package transporting conveyor system of FIGS. 1-4.

By way of an illustrative embodiment for making the present invention more readily understandable, FIGS. 1-5 particularly illustrate a package transporting conveyor system constructed and arranged for use in a bottling plant having a main conveyor line 10 normally moving packages along a predetermined path of travel, such as from the left to the right in FIG. 1. In the form illustrated, the main conveyor line 10 comprises two parallel runs of chained conveyor plates 11. As is generally known to persons skilled in the art of package transporting conveyor systems, elements such as the plates 11 may be connected into flexible, endless loop conveyor members for receiving and transporting packages with the endless loop conveyor members normally being supported by appropriate sprocket means and stationary support means to provide for transmittal of driving motive power thereto. As illustrated somewhat schematically in FIG. 2, underlying support means 12 and sprockets 14 may engage the conveyor members formed by the plates 11 so that the main conveyor line defines a generally horizontal package supporting surface for receiving conveyed packages such as bottles B (FIG. 2 and phantom line circles in FIG. 1).

For various of the reasons briefly mentioned above, bottles B will from time to time be blocked from normal movement along the predetermined path of travel defined by the main conveyor line 10, as in the event of an interruption in the operation of an automatic machine or in the event of jamming of the bottles. Upon such blockage, bottles B rapidly build up along the main conveyor line 10 inasmuch as movement of the main conveyor line 10 is not interrupted. In accordance with the present invention, packages are temporarily accumulated from the main conveyor line and subsequently redelivered thereto by an accumulating means which comprises a reversible accumulating conveyor generally indicated at 20 and mounted adjacent the main conveyor line 10 for package transporting movement away from and toward the main conveyor line along a path perpendicular to the predetermined path of travel defined by the main conveyor line.

In the illustrated embodiment, and as will be more fully pointed out hereinafter, the accumulating conveyor means 20 comprises a plurality of flexible, endless conveyor members formed by chained together plates 21 (six flexible endless conveyor members being shown in FIG. 1). By means of suitable upright standards 22, 24 (FIG. 2) and side frame members 25, 26 (FIGS. 2 and 3), the accumulating conveyor means 20 is supported to define a generally horizontal package supporting surface lying substantially in a common plane with a generally horizontal package supporting surface of the main conveyor line 10 (FIGS. 2 and 4). Thus, bottles B may move back and forth between the main conveyor line 10 and the accumulating conveyor means 20 at a package receiving and delivering location which is more particularly defined by a dead plate 28 (FIG. 4).

As will be understood, it is desirable for the main conveyor line 10 and the accumulating conveyor means 20 to as nearly intersect as is possible. Nevertheless, due to the necessary reversal in direction of the accumulating conveyor means 20 adjacent the side edge of the main conveyor line 10, the radius of movement required (as indicated by FIGS. 2 and 4) necessitates the use of the dead plate 28 in order to ensure the horizontal package supporting surface is continuous between the plates 11 and the main conveyor line 10 and the plates 21 of the accumulating conveyor means 20.

The plurality of flexible, endless loop conveyor members which together form the accumulating conveyor means 20 are supported for movement about a predetermined closed path of travel by sprocket means and stationary support means mounted from the standards 22, 24 and frame side plates 25, 26. In particular, a front cross shaft 29 (FIG. 3) is mounted for rotation by bearings 30, 31 secured to the side plate members 25, 26 and carries front conveyor member sprockets 32, 34. Due to the partial breaking away of FIG. 3 in order to illustrate the details of the present invention with greater clarity, only two front conveyor sprockets are illustrated, but it is to be understood that each of the flexible, endless loop conveyor members formed by chained together plates 21 is provided with a corresponding sprocket. Each of the flexible, endless loop conveyor members additionally passes in engagement with a corresponding driven sprocket, such as the driven sprocket 35 in FIG. 2. The driven sprockets are mounted together on a driven cross shaft 36, for rotation therewith under impetus provided by a reversing drive means generally indicated at 38. Desirably, the reversing drive means 38 includes a reversible electrical motor 39 (FIG. 5), a suitable manually variable transmission to permit variance in the final output speed obtained from the reversing drive means 38, and a drive chain 40 operatively connecting the reversing drive means 38 to the driven shaft 36.

As will be understood, the front sprocket members 32, 34 and corresponding ones of the driven sprockets such as the sprocket 35 cooperate in supporting the flexible endless loop conveyor members for movement about a predetermined closed path of travel including a generally horizontal upper run and a lower run. In accordance with the present invention, the conveyor members are supported in the upper run by stationary support means 41 which underlie the conveyor members along the horizontal path. Further, stationary supporting bars 42, 44 are positioned in spaced locations below the lower run of the endless loop conveyor members.

In accordance with an important feature of the present invention, the driven sprocket 35 cooperates in a particular manner with the stationary support means 41 for accomplishing reversing drive of the endless loop conveyor members in a particularly advantageous manner. As is generally known to designers of conveyor systems employing plates such as the members 21 which are chained together to form an endless loop conveyor member, it is desirable that the conveyor member be pulled along a horizontal path portion in which a package supporting surface is defined, due to difficulties encountered in pushing such flexible, endless loop conveyor members. Typically, in accordance with such prior art practices, allowance is made for the conveyor member to assume, on the lower horizontal run, a catenary curve to accommodate slackness in the endless loop conveyor member coming about through wear of the plate members or manufacturing tolerances.

In accordance with the present invention, the stationary support means 41 extends from a location adjacent the main conveyor line 10 to a point spaced from the driven sprocket 35 (FIG. 2) for accommodating the presence of the catenary curve portion of the conveyor member between the driven sprocket 35 and the stationary support means 41 (as indicated by phantom lines in FIG. 2). Particularly in the instance of the present invention, where a plurality of flexible, endless loop conveyor members are arranged side by side, the spacing of the stationary support means from the driven sprocket 35 provides accommodation for varying degrees of slackness among the plurality of conveyor members. Reversible drive of the accumulating means 20 is accommodated in that tension may be present in the upper horizontal run of the conveyor members while the conveyor is driven in movement away from the main conveyor line 10, while tension may be present in the lower horizontal run as the accumulating conveyor means 20 is driven in movement toward the main conveyor line 10. In either instance, the necessary accommodation of slack in the endless loop conveyor members is provided, by the accommodation of the catenary curve portion of the conveyor member along the conveyor run which is not under tension.

Package transporting movement of the accumulating conveyor means 20 away from and toward the main conveyor line 10, under the impetus provided by the driving means 38, occurs through the operation of a control means which includes means, as shall now be described, for sensing the presence and absence of an excessive numbers of packages on the main conveyor line 10. By such sensing of packages on the main conveyor line 10, the control means responds to the occurrence of a blockage of normal package movement along the main conveyor line by driving the accumulating conveyor means 20 in movement away from the main conveyor line 10 so as to move packages away from the predetermined path of travel. Further, the control means responds to resumption of normal package movement along the main conveyor line 10 by driving the accumulating conveyor means 20 in movement toward the main conveyor line so as to return packages to the predetermined path of travel. Such control is accomplished through the cooperation of the elements of electrical circuitry schematically illustrated in FIG. 5, which are related to main conveyor line 10 and accumulating conveyor means 20 as there schematically illustrated and as more fully shown in FIGS. 1–3.

In accordance with the present invention, the energization of the electrical drive motor 39, and thus the direction of rotation imparted thereby to the driven shaft 36, is determined by a forward drive relay generally indicated at 50 and a reverse drive relay generally indicated at 51. The relays include respective control windings 52, 53 and associated contact sets 52a, 52b, 52c, 52d, 53a, 53b, 53c, 53d. In each instance, the contact sets identified by the subscripts a, b and c control the interconnection of the motor 39 with a source of three-phase electrical current, to thereby control the direction of the rotation of the motor 39. Energization of the respective windings 52 and 53 of the forward relay 50 and reverse relay 51 is governed by the interaction of a plurality of sensing devices, in the form of electrical switches LS1, LS2, LS3, LS4, and LS5, together with time delay relays generally indicated at 55 and 56. Each of the time delay relays includes a respective control winding 57, 58 and contact set 57a, 58a controlled thereby. The functions and cooperation of the various elements of the control means shall be brought out more fully in the discussion which follows.

The primary control over timing as to when the accumulating conveyor means 20 is to be driven and over determination of the direction in which the accumulating conveyor means 20 is to move are accomplished by a limit switch LS1 positioned adjacent the package receiving and delivering location and a limit switch LS2 positioned along the main conveyor line 10 downstream of the accumulating conveyor means 20. The downstream limit switch LS2 detects crowding of packages along the main conveyor line 10 downstream of the accumulating conveyor means 20 by the provision of an actuating lever which protrudes outward over the main conveyor line 10 between portions of an edge rail extending along the main conveyor line (FIGS. 1 and 2). In the event of blockage of bottles B from normal movement along the main conveyor line 10, and the resulting build up of bottles along the main conveyor line 10, the number of packages present eventually will bring packages into engagement with the operating lever of the limit switch LS2, swinging the operating lever outwardly until packages may come into engagement with the outer edge rail 60. As will be understood, upon a subsequent clearance of the blockage, so that bottles B move properly along the main conveyor line 10, the actuating lever for the limit switch LS2 will be released to swing outward to the position indicated in FIGS. 1 and 2. As will be noted from FIG. 5, the limit switch LS2 includes a first contact set which is normally closed during normal movement of packages along the main conveyor line 10 (as indicated by the positions illustrated in FIGS. 1, 2 and 5) and a second contact set normally open during normal movement of packages along the main conveyor line 10. In the event of a blockage of packages and the build up of an excessive number along the main conveyor line 10, the normally closed contact set is open and the normally open contact set is closed.

With the build up of packages along the main conveyor line 10, packages ultimately become crowded between the edge rail 60 of the main conveyor line 10 and a package stabilizing rail means generally indicated at 61 which is mounted in predetermined relation to the accumulating conveyor means 20 for normally forming a portion of an edge rail extending along the other side of the main conveyor line from the edge rail 60. The package stabilizing rail means serves at least two functions in the apparatus of the present invention, one of which is to cooperate with a limit switch LS1 in determining when the accumulating conveyor means 20 is to be driven by the drive means 38. In particular, as crowding of bottles B along the main conveyor line 10 continues, bottles are crowded onto the accumulating conveyor means 20 across the dead plate 28 and move the package stabilizing rail means 61 away from a position overlying the dead plate 28 in which the rail means 61 normally forms a portion of an edge rail extending along the main conveyor line 10. With such movement of the package stabilizing rail means 61, the crowding limit switch LS1 is closed, energizing one of the timing relays 55, 56 through whichever contact set of the downstream limit switch LS2 is closed. At initial crowding of bottles onto the accumulating conveyor means 20, the conductive state of the downstream limit switch LS2 is such that the winding 57 of the timing relay 55 is energized. After a predetermined interval of time, established in order to avoid excessively quick cycling of the drive means 38, the contact set 57a of the time delay relay 55 closes, energizing the winding 52 of the reverse drive relay 55, through contacts of a full table limit switch LS3 and contact set 53b of the forward relay 51. With energization of the winding 52 of the reverse relay 50, the associated contact set 52a, 52b and 52c are closed, energizing the drive motor 39 and transmitting rotational motive power to the accumulating conveyor means 20 to move the same away from the main conveyor line 10. The bottles B crowding onto the accumulating conveyor means 20 are thus transported away from the main conveyor line in accommodation of the overflow condition then current.

With subsequent clearing of the blockage downstream of the accumulating conveyor means 20, the conductive state of the contacts of the downstream limit switch LS2 changes, de-energizing the winding 57 of the timing relay 55, interrupting energization of the winding 52 of the reverse relay 50, and thereby de-energizing the drive motor 39. At the same time, the winding 58 of the timing relay 56 is energized and, after a suitable delay interval, closure of the contact set 58a occurs. Upon such contact closure, the winding 53 of the forward relay 51 is energized, through the contact set 52d of the reverse relay 50. Closure of the contact sets 53a, 53b, 53c then energizes the drive motor 39 to move the accumulating conveyor means 20 toward the main conveyor line 10, redelivering accumulated packages to the main conveyor line.

The control means of the present invention contemplates cooperation with the primary limit switches LS1, LS2 of secondary limit switches LS3, LS4, and LS5 which provide safety interlocks in the event of certain operational occurrences otherwise possibly leading to damages to conveyed packages or to the conveyor system.

More particularly, as packages are accumulated on the accumulating conveyor means 20, the package stabilizing rail means 61 moves with the conveyor means away from the main conveyor line 10. In the event that the available area on the accumulating conveyor means 20 becomes fully crowded with accumulated packages, it is desirable to stop further driving of the accumulating conveyor means 20. This desired control function is accomplished through the cooperation of the limit switches LS3 and LS5, which together sense the presence on the accumulating conveyor means of such number of packages as to fill the capacity thereof for temporary accumulation of packages. More particularly, movement of the stabilizing rail means 61 to a position fully withdrawn from the main conveyor line 10 brings such stabilizing rail means into contact with a full table limit switch LS3, opening contacts thereof and thereby opening one of two parallel circuits between the contact set 57a of the timing relay 55 and the winding 52 of the reverse driving relay 50. Continued accumulation of packages on the accumulating conveyor means 20 ultimately results in such crowding of packages thereonto as to engage an operating lever for a front table limit switch LS5, swinging such operating lever to one side and opening the other parallel branch circuit. With such opening of the circuit, the winding 52 of the reverse driving relay 50 becomes fully de-energized, and energization of the drive motor 39 is interrupted.

During redelivery of packages from the accumulating conveyor means to the main conveyor line, an opposing limit switch LS4 senses the redelivery of such number of packages as to momentarily fill the capacity of the main conveyor line to move packages along the predetermined path of travel, in that excessive delivery of packages will result in temporary crowding between the package receiving and redelivery relocation and the side rail 60 of the main conveyor line 10. Such crowding pivots an actuation arm of the opposing limit switch LS4, opening the contacts thereof and de-energizing the winding 58 of the timing relay 56. In such an event, movement of the accumulating conveyor means 20 toward the main conveyor line 10 is interrupted until such time as normal movement of packages along the main conveyor line 10 clear the overcrowded condition adjacent the opposing limit switch LS4.

One function served by the package accumulating rail means 61, through its cooperation with the control means of the present invention, has been disclosed hereinabove. It is to be noted that the package stabilizing rail means 61 has other and further important functions in the system of the present invention, in that the rail means 61 is both movable relative to the accumulating conveyor means 20 and moves therewith, for engaging packages crowded onto the accumulating conveyor means 20 and for thereby facilitating maintenance of an engaged package in a desired orientation on the package supporting surface provided by the accumulating conveyor means 20. In particular, it is to be noted that the package stabilizing rail means 61 comprises a frame including an abutment member 62 mounted from side plate members 64, 65 which rests upon the plate 21 of the accumulating conveyor means 20 through means of skid members 66, 68. Extending through the side plate members 65, 64 is a cross shaft 70 bearing sprocket members 71, 72 adjacent opposite ends thereof. The sprocket members 71, 72 engage endless chains 73, 74 which move with the endless conveyor members of the accumulating conveyor means 20 as the conveyor means 20 is driven in movement away from and toward the main conveyor line 10. The cross shaft 70 is free to rotate relative to the side frame members 64, 65 in order that the package stabilizing rail means may be both movable relative to the accumulating conveyor means 20 and movable with the accumulating conveyor means 20.

More particularly, if no other forces are exerted on the package stabilizing rail means 61, the rail means 61 will move away from and toward the main conveyor line 10 with movement of the accumulating conveyor means 20. However, should the package stabilizing rail means 61 encounter a limiting abutment, such as the rear frame 75 of the accumulating conveyor means 20 or the forward frame portion thereof, continued movement of the chains 73, 74 will cause rotation of the sprockets 71, 72 without translational movement of the rail means 61. Further, in the event that the accumulating conveyor means 20 is momentarily stationary and force is applied to the rail means 61 as upon the crowding of bottles across the dead plate 28, movement of the sprockets 71, 72 along the chains 73, 74 accommodates movement of the stabilizing rail means 61 relative to the accumulating conveyor means 20.

The operative relationship between the rail means 61 and the accumulating conveyor means 20 has importance, beyond the control functions disclosed hereinabove, in that the maintenance of packages in a desired orientation on the package supporting surfaces of the conveyor means 20 and the main conveyor line 10, without rotation or other relative movement of the packages, is accomplished at least part by the absence of relative movement between the packages and the stabilizing rail means during transitional movement of the packages across the dead plate 28 between the main conveyor line 10 and the accumulating conveyor means 20. Such reception of packages crowded on the accumulating conveyor means 20 or redelivery of packages therefrom onto the main conveyor line 10 contrasts with practices heretofore encountered in recirculating conveyor arrangements, and is of significance in accomplishing the desired results for the apparatus of the present invention. Particularly, it is to be noted that the normal position of the stabilizing rail means 61 (FIGS. 1 and 2) is overlying the dead plate 28, as after pushing of a temporary accumulated package back onto the main conveyor line 10.

In the drawings and specification, there has been set forth a preferred embodiment of the invention, and although specific terms are employed, they are used in a generic and descriptive sense only and not for purposes of limitation.

What is claimed is:

1. In a package transporting conveyor system having a main conveyor line normally moving packages along a predetermined path of travel, the combination therewith of means operable in the event of blockage of packages from normal movement along the predetermined path for temporarily accumulating packages from the main conveyor line and subsequently redelivering accumulated packages thereto, the accumulating means comprising:

accumulating conveyor means mounted adjacent said main conveyor line for package transporting movement away from and toward said main conveyor line along a path perpendicular to said predetermined path of travel, reversible drive means operatively connected to said accumulating conveyor means for driving the same in package transporting movement away from and toward said main conveyor line, and control means operatively connected to said reversible drive means for controlling driving of said accumulating conveyor means and including means for sensing the presence and absence of excessive numbers of packages on said main conveyor line, said control means responding to the sensed presence of excessive numbers of packages on said main conveyor line by initiating driving of said accumulating conveyor means in movement away from said main conveyor line so as to move packages away from said predetermined path of travel and further responding to the sensed absence of excessive numbers of packages on said main conveyor line by initiating driving of said accumulating conveyor means in movement toward said main conveyor line so as to return packages to said predetermined path of travel.

2. A conveyor system according to claim 1 wherein said main conveyor line and said accumulating conveyor means define generally horizontal package supporting surfaces lying substantially in a common plane and further comprising package stabilizing rail means mounted in predetermined relation to said accumulating conveyor means for normally forming a portion of an edge rail extending along said main conveyor line, said package stabilizing rail means being movable relative to said main conveyor line for engaging packages crowded onto said accumulating conveyor means by the presence of excessive numbers of packages on the main conveyor line and thereby for facilitating maintenance of engaged packages in their desired orientation on said package supporting surfaces.

3. A conveyor system according to claim 2 wherein said package stabilizing rail means is operatively connected to said accumulating conveyor means for movement therewith in response to said drive means driving said accumulating conveyor means and for movement relative thereto in response to crowding of packages onto said accumulating conveyor means from said main conveyor line.

4. A conveyor system according to claim 2 wherein said package stabilizing rail means cooperates with said control means in sensing of the presence of excessive numbers of packages on said main conveyor line, said control means sensing movement of said package stabilizing rail means away from said main conveyor line in response to crowding of packages onto said accumulating conveyor means from said main conveyor line.

5. A conveyor system according to claim 1 wherein said accumulating conveyor means comprises at least one flexible, endless loop conveyor member and sprocket means supporting said member for movement about a predetermined closed path of travel including a generally horizontal portion wherein said conveyor member defines a package supporting surface and further wherein said reversing drive means is operatively connected to said sprocket means for driving said sprocket means in a first rotational direction for movement of said conveyor member along said horizontal path away from said main conveyor line and in a second, opposite rotational direction for movement of said conveyor member along said horizontal path toward said main conveyor line.

6. A conveyor system according to claim 5 wherein said sprocket means comprises a driven sprocket mounted at a location remote from said main conveyor line and operatively connected to said drive means for transmitting to said conveyor member motive power driving said conveyor member both away from and toward said main conveyor line and further wherein said accumulating conveyor means comprises stationary support means underlying said conveyor member along said horizontal path for cooperation with said sprocket means in supporting said conveyor member, said stationary support means extending from adjacent said main conveyor line to a point spaced from said driven sprocket for accommodating the presence of a catenary curve portion of said conveyor member between said driven sprocket and said stationary support means.

7. A conveyor system according to claim 1 wherein said means for sensing the presence and absence of excessive members of packages on said main line conveyor comprises a first sensing device positioned along said main conveyor line downstream of said accumulating conveyor means for detecting crowding of packages therealong and a second sensing device positioned for detecting crowding of packages from said main conveyor line onto said accumulating conveyor means, said first sensing device cooperating in said control means for determining the direction in which said accumulating conveyor means is to be driven by said drive means and said second sensing device cooperating in said control means for determining when said accumulating conveyor means is to be driven.

8. A conveyor system according to claim 7 wherein said control means further comprises means for sensing the presence on the accumulating conveyor means of such number of packages as to fill the capacity thereof for temporary accumulation of packages, said control means being responsive to sensing of such capacity accumulation for interrupting driving of said accumulating conveyor means away from said main conveyor line.

9. A conveyor system according to claim 7 wherein said control means further comprises means for sensing the redelivery from the accumulating conveyor means to the main conveyor line of such number of packages as to momentarily fill the capacity of the main conveyor line to move packages along said predetermined path of travel, said control means being responsive to sensing of such capacity redelivery for interrupting driving of said accumulating conveyor means toward said main conveyor line.

* * * * *